US012454661B2

(12) United States Patent
Backer et al.

(10) Patent No.: US 12,454,661 B2
(45) Date of Patent: Oct. 28, 2025

(54) DISHWASHING FORMULATION WITH DISPERSANT COPOLYMER

(71) Applicants: Rohm and Haas Company, Collegeville, PA (US); Dow Silicones Corporation, Midland, MI (US)

(72) Inventors: Scott Backer, Phoenixville, PA (US); Paul Mercando, Pennsburg, PA (US); Ashutosh Umarvadia, Horsham, PA (US); Severine Cauvin, Mons (BE); Michael C. Mitchell, Norristown, PA (US); Marianne Creamer, Warrington, PA (US)

(73) Assignees: Rohm and Haas Company, Collegeville, PA (US); DOW SILICONES CORPORATION, Midland, MI (US)

( * ) Notice: Subject to any disclaimer, the term of this patent is extended or adjusted under 35 U.S.C. 154(b) by 405 days.

(21) Appl. No.: 17/923,745

(22) PCT Filed: Jun. 18, 2021

(86) PCT No.: PCT/US2021/037971
§ 371 (c)(1),
(2) Date: Nov. 7, 2022

(87) PCT Pub. No.: WO2021/262534
PCT Pub. Date: Dec. 30, 2021

(65) Prior Publication Data

US 2023/0183614 A1 Jun. 15, 2023

Related U.S. Application Data

(60) Provisional application No. 63/043,258, filed on Jun. 24, 2020.

(51) Int. Cl.

| | |
|---|---|
| ***C11D 1/66*** | (2006.01) |
| ***C08F 20/06*** | (2006.01) |
| ***C11D 1/72*** | (2006.01) |
| ***C11D 3/04*** | (2006.01) |
| ***C11D 3/08*** | (2006.01) |

(Continued)

(52) U.S. Cl.

CPC ............ *C11D 3/3761* (2013.01); *C08F 20/06* (2013.01); *C11D 1/72* (2013.01); *C11D 3/046* (2013.01); *C11D 3/08* (2013.01); *C11D 3/10* (2013.01); *C11D 3/2086* (2013.01); *C11D 3/32* (2013.01); *C11D 3/361* (2013.01); *C11D 3/3757* (2013.01); *C11D 3/3765* (2013.01); *C11D 3/38609* (2013.01); *C11D 3/38618* (2013.01); *C11D 3/3905* (2013.01); *C11D 3/3917* (2013.01); *C11D 3/3942* (2013.01); *C11D 2111/14* (2024.01)

(58) Field of Classification Search

CPC ........... C11D 3/08; C11D 3/10; C11D 3/3905; C11D 3/3917; C11D 3/361; C11D 3/3757; C11D 3/3765; C11D 3/38609; C11D 3/38618

USPC ....... 510/223, 229, 372, 475, 476, 477, 488, 510/421, 392, 393

See application file for complete search history.

(56) References Cited

U.S. PATENT DOCUMENTS

| | | | | |
|---|---|---|---|---|
| 5,308,532 | A * | 5/1994 | Adler | C11D 3/3773 510/223 |
| 2009/0305934 | A1 | 12/2009 | Creamer et al. | |
| 2019/0256802 | A1 * | 8/2019 | Delplancke | C11D 3/38609 |

FOREIGN PATENT DOCUMENTS

| | | | | |
|---|---|---|---|---|
| AU | 2013363660 A1 * | 7/2015 | | C11D 3/33 |
| CA | 2296719 A1 * | 2/1999 | | C11D 3/33 |

(Continued)

OTHER PUBLICATIONS

Sibilia, "A Guide to Materials Characterization and Chemical Analysis", VCH, 1988, pp. 81-84.

(Continued)

*Primary Examiner* — Gregory R Delcotto
(74) *Attorney, Agent, or Firm* — Thomas S. Deibert

(57) ABSTRACT

An automatic dishwashing composition is provided including a builder; a nonionic surfactant; and a dispersant polymer comprising: (a) >60 to <90 wt %, based on weight of the dispersant polymer, of structural units of formula I

I

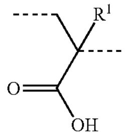

wherein each $R^1$ is independently selected from a hydrogen and a —$CH_3$ group; and (b) >10 to <40 wt %, based on weight of the dispersant polymer, of structural units of formula II

II

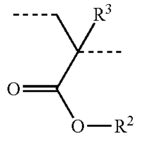

wherein each $R^2$ is independently selected from the group consisting of a $C_{1-6}$ hydroxyalkyl group and a $C_{1-6}$ alkoxy (Continued)

group; and wherein each $R^3$ is independently selected from a hydrogen and a methyl group.

5 Claims, No Drawings

(51) Int. Cl.

| | |
|---|---|
| ***C11D 3/10*** | (2006.01) |
| ***C11D 3/20*** | (2006.01) |
| ***C11D 3/32*** | (2006.01) |
| ***C11D 3/36*** | (2006.01) |
| ***C11D 3/37*** | (2006.01) |
| ***C11D 3/386*** | (2006.01) |
| ***C11D 3/39*** | (2006.01) |

(56) References Cited

FOREIGN PATENT DOCUMENTS

| | | | | |
|---|---|---|---|---|
| CN | 110373287 A | 10/2019 | | |
| EP | 0560519 A2 * | 9/1993 | ............... | C11D 3/33 |
| EP | 0770673 A2 | 5/1997 | | |
| EP | 2886634 A1 * | 6/2015 | ............... | C11D 1/66 |

OTHER PUBLICATIONS

Yau, "Modem Size Exclusion Chromatography", Wiley-Interscience, 1979.

* cited by examiner

DISHWASHING FORMULATION WITH DISPERSANT COPOLYMER

The present invention relates to a dispersant copolymer for use in automatic dishwashing formulations. In particular, the present invention relates to automatic dishwashing compositions incorporating a dispersant polymer having superior multisurface spotting and filming performance.

Automatic dishwashing compositions are generally recognized as a class of detergent compositions distinct from those used for fabric washing or water treatment. Automatic dishwashing compositions are expected by users to produce a spotless and film-free appearance on washed articles after a complete cleaning cycle.

Phosphate-free automatic dishwashing compositions are increasingly desirable. Phosphate-free automatic dishwashing compositions typically rely on non-phosphate builders, such as salts of citrate, carbonate, silicate, disilicate, bicarbonate, aminocarboxylates and others to sequester calcium and magnesium from hard water, and upon drying, leave an insoluble visible deposit.

Currently available polymers employed in phosphate-free automatic dishwashing compositions to combat the formation of undesirable deposits on glassware include polyacrylic acid polymers and copolymers of acrylic acid and 2-acrylamido-2-methylpropane sulfonic acid (AMPS) and sodium styrene sulfonate (SSS). Polyacrylic acid polymers, however, fail to prevent certain film deposits on glassware (e.g., magnesium disilicate and calcium phosphonate scales), which present as transparent blue to blue/white films on glassware and brown films on stainless steel. Copolymers of acrylic acid with sulfonated monomers, while excellent at silicate and phosphonate scale prevention, such copolymers are not particularly effective at carbonate scale prevention. In addition, such polymers tend to have a negative impact on spotting, requiring the use of strong chelants or specialized surfactants, which lead to undesirable increases in the overall cost of the dishwashing composition.

Accordingly, there remains a need for new dispersant polymers for use in automatic dish washing formulations. In particular, there remains a need for new dispersant polymers for use in automatic dish washing formulations, wherein the dispersant polymers provide suitable spotting and/or filming performance when incorporated into phosphate-free formulations.

The present invention provides an automatic dishwashing composition, comprising: a builder; a nonionic surfactant; and a dispersant polymer comprising: (a) >60 to <90 wt %, based on weight of the dispersant polymer, of structural units of formula I

I

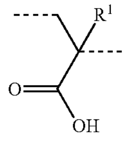

wherein each $R^1$ is independently selected from a hydrogen and a —$CH_3$ group; and (b) >10 to <40 wt %, based on weight of the dispersant polymer, of structural units of formula II

II

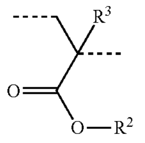

wherein each $R^2$ is independently selected from the group consisting of a $C_{1-6}$ hydroxyalkyl group and a $C_{1-6}$ alkoxy group; and wherein each $R^3$ is independently selected from a hydrogen and a methyl group.

The present invention provides an automatic dishwashing composition, comprising: a builder; a phosphonate; a nonionic surfactant; and a dispersant polymer comprising: (a) >60 to <90 wt %, based on weight of the dispersant polymer, of structural units of formula I; wherein each $R^1$ is independently selected from a hydrogen and a —$CH_3$ group; and (b) >10 to <40 wt %, based on weight of the dispersant polymer, of structural units of formula II; wherein each $R^2$ is independently selected from the group consisting of a $C_{1-6}$ hydroxyalkyl group and a $C_{1-6}$ alkoxy group; and wherein each $R^3$ is independently selected from a hydrogen and a methyl group.

The present invention provides an automatic dishwashing composition, comprising: 50 to 85 wt %, based on dry weight of the automatic dishwashing composition, of a builder; 0.75 to 7 wt %, based on dry weight of the automatic dishwashing composition, of a phosphonate; 1.5 to 7.5 wt %, based on dry weight of the automatic dishwashing composition, of a nonionic surfactant; and 2 to 6 wt %, based on dry weight of the automatic dishwashing composition, of a dispersant polymer comprising: (a) 75 to 82.5 wt %, based on weight of the dispersant polymer, of structural units of formula I; wherein each $R^1$ is independently selected from a hydrogen and a —$CH_3$ group; wherein $R^1$ is a hydrogen in 98 to 100 mol % of the structural units of formula I; and (b) 17.5 to 25 wt %, based on weight of the dispersant polymer, of structural units of formula II; wherein each $R^2$ is independently selected from the group consisting of a $C_{1-6}$ hydroxyalkyl group and a $C_{1-6}$ alkoxy group; wherein $R^2$ is an hydroxypropyl group in 98 to 100 mol % of the structural units of formula II; wherein each $R^3$ is independently selected from a hydrogen and a methyl group; wherein $R^3$ is a hydrogen in 98 to 100 mol % of the structural units of formula II; and wherein the dispersant polymer has a weight average molecular weight, $M_W$, of 1,750 to 17,500 Daltons.

The present invention provides a method of cleaning an article in an automatic dishwashing machine, comprising: providing at least one article; providing an automatic dishwashing composition according to the present invention; and, applying the automatic dishwashing composition to the at least one article.

DETAILED DESCRIPTION

Surprisingly, it has been found that, the dispersant polymers of the present invention when incorporated into automatic dishwashing compositions (particularly phosphate-free automatic dishwashing compositions), the dispersant polymer of the present invention as particularly described herein surprisingly give good spotting and filming performance on a range of surfaces, including plastic, versus conventional dispersant polymers.

Unless otherwise indicated, ratios, percentages, parts, and the like are by weight. Weight percentages (or wt %) in the composition are percentages of dry weight, i.e., excluding any water that may be present in the composition. Percentages of monomer units in the polymer are percentages of solids weight, i.e., excluding any water present in a polymer emulsion.

As used herein, unless otherwise indicated, the terms "weight average molecular weight" and "Mw" are used interchangeably to refer to the weight average molecular weight as measured in a conventional manner with gel permeation chromatography (GPC) and conventional standards, such as polystyrene standards. GPC techniques are discussed in detail in Modem Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Weight average molecular weights are reported herein in units of Daltons.

The term "phosphate-free" as used herein and in the appended claims means compositions containing ≤1 wt % (preferably, ≤0.5 wt %; more preferably, ≤0.2 wt %; still more preferably, ≤0.01 wt %; yet still more preferably, ≤0.001 wt %; most preferably, less than the detectable limit) of phosphate (measured as elemental phosphorus).

The term "structural units" as used herein and in the appended claims refers to the remnant of the indicated monomer; thus a structural unit of (meth)acrylic acid is illustrated:

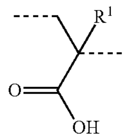

wherein the dotted lines represent the points of attachment to the polymer backbone and where $R^1$ is a hydrogen for structural units of acrylic acid and a —$CH_3$ group for structural units of methacrylic acid.

Preferably, the automatic dishwashing composition of the present invention, comprises: a builder (preferably, 1 to 97 wt % (more preferably, ≥10 wt %; yet more preferably, ≥20 wt %; still more preferably, ≥25 wt %; most preferably, ≥50 wt %; preferably, ≤95 wt %; more preferably, ≤90 wt %; still more preferably, ≤85 wt %; most preferably, ≤80 wt %), based on the dry weight of the automatic dishwashing composition, of the builder)(preferably, wherein the builder includes a mixture of at least one carbonate and at least one citrate); a nonionic surfactant (preferably, 0.2 to 15 wt % (more preferably, 0.5 to 10 wt %; most preferably, 1.5 to 7.5 wt %), based on the dry weight of the automatic dishwashing composition, of the nonionic surfactant)(preferably, wherein the nonionic surfactant is a fatty alcohol alkoxylate); and a dispersant polymer (preferably, 0.5 to 15 wt % (more preferably, 0.5 to 10 wt %; still more preferably, 1 to 8 wt %; most preferably, 2 to 6 wt %), based on the dry weight of the automatic dishwashing composition, of the dispersant polymer) comprising: (a) >60 to <90 wt %, based on weight of the dispersant polymer, of structural units of formula I

I

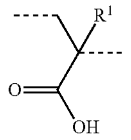

wherein each $R^1$ is independently selected from a hydrogen and a —$CH_3$ group; and (b) >10 to <40 wt %, based on weight of the dispersant polymer, of structural units of formula II

II

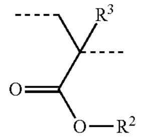

wherein each $R^2$ is independently selected from the group consisting of a $C_{1-6}$ hydroxyalkyl group and a $C_{1-6}$ alkoxy group —$C_{1-4}$ alkyl group; and wherein each $R^3$ is independently selected from a hydrogen and a methyl group.

Preferably, the automatic dishwashing composition of the present invention, comprises a builder. Preferably, the automatic dishwashing composition of the present invention, comprises a builder, wherein the builder comprises a mixture of at least one carbonate and at least one citrate. More preferably, the automatic dishwashing composition of the present invention comprises a builder, wherein the builder comprises a mixture of at least one carbonate, at least one citrate and at least one citrate. Most more preferably, the automatic dishwashing composition of the present invention, comprises: a builder, wherein the builder comprises a mixture of sodium carbonate and sodium citrate.

Preferably, the automatic dishwashing composition of the present invention, comprises: 1 to 97 wt %, based on the dry weight of the automatic dishwashing composition, of a builder. Preferably, the automatic dishwashing composition of the present invention, comprises: ≥1 wt % (preferably, ≥10 wt %; more preferably, ≥20 wt %; yet more preferably, ≥25 wt %; most preferably, ≥50 wt %), based on the dry weight of the automatic dishwashing composition, of the builder. Preferably, the automatic dishwashing composition of the present invention, comprises: ≤95 wt % (preferably, ≤90 wt %; more preferably, ≤85 wt %; most preferably, ≤80 wt %), based on the dry weight of the automatic dishwashing composition, of the builder. Weight percentages of carbonate, citrate and silicate builders are based on the actual weights of the salts, including metal ions.

The term "carbonate(s)" as used herein and in the appended claims refers to alkali metal or ammonium salts of carbonate, bicarbonate and/or sesquicarbonate. Preferably, the carbonate used in the automatic dishwashing composition (if any) is selected from the group consisting of carbonate salts of sodium, potassium and lithium (more preferably, salts of sodium or potassium; most preferably, salts of sodium). Most preferably, the carbonate used in the automatic dishwashing composition (if any) includes at least one of sodium carbonate and sodium bicarbonate. Preferably, when the builder used in the automatic dishwashing composition of the present invention includes carbonate, the automatic dishwashing composition preferably, comprises 0 to 97 wt % (preferably, 10 to 75 wt %; more preferably, 25 to 60 wt %; most preferably 40 to 50 wt %), based on the dry weight of the automatic dishwashing composition, of carbonate.

The term "citrate(s)" as used herein and in the appended claims refers to alkali metal citrates. Preferably, the citrate used in the automatic dishwashing composition (if any) is selected from the group consisting of citrate salts of sodium, potassium and lithium (more preferably, salts of sodium or potassium; most preferably, salts of sodium). More preferably, the citrate used in the automatic dishwashing composition (if any) is sodium citrate. Preferably, when the builder used in the automatic dishwashing composition of the present invention includes citrate, the automatic dishwashing composition preferably, comprises 0 to 97 wt % (preferably, 5 to 75 wt %; more preferably, 10 to 60 wt %; most preferably 20 to 40 wt %), based on the dry weight of the automatic dishwashing composition, of the citrate.

The term "silicate(s)" as used herein and in the appended claims refers to alkali metal silicates. Preferably, the silicate used in the automatic dishwashing composition (if any) is selected from the group consisting of silicate salts of sodium, potassium and lithium (more preferably, salts of sodium or potassium; most preferably, salts of sodium). More preferably, the silicate used in the automatic dishwashing composition (if any) is sodium disilicate. Preferably, the builder used in the automatic dishwashing composition of the present invention includes a silicate. Preferably, when the builder used in the automatic dishwashing composition of the present invention includes a silicate, the automatic dishwashing composition preferably, comprises 0 to 97 wt % (preferably, 0.1 to 10 wt %; more preferably, 0.5 to 7.5 wt %; most preferably 0.75 to 3 wt %), based on the dry weight of the automatic dishwashing composition, of the silicate.

Preferably, the automatic dishwashing composition of the present invention, comprises: 0.2 to 15 wt % (preferably, 0.5 to 10 wt %; more preferably, 1.5 to 7.5 wt %), based on the dry weight of the automatic dishwashing composition, of a nonionic surfactant. More preferably, the automatic dishwashing composition of the present invention, comprises: 0.2 to 15 wt % (preferably, 0.5 to 10 wt %; more preferably, 1.5 to 7.5 wt %), based on the dry weight of the automatic dishwashing composition, of the nonionic surfactant; wherein the surfactant comprises a fatty alcohol alkoxylate. Most preferably, the automatic dishwashing composition of the present invention, comprises: 0.2 to 15 wt % (preferably, 0.5 to 10 wt %; more preferably, 1.5 to 7.5 wt %), based on the dry weight of the automatic dishwashing composition, of the nonionic surfactant; wherein the surfactant is a fatty alcohol alkoxylate.

Preferably, the nonionic surfactant used in the automatic dishwashing composition of the present invention has a formula selected from $$RO\text{-}(M)_x\text{-}(N)_y\text{—}OH, \text{ and}$$

$$RO\text{-}(M)_x\text{-}(N)_y\text{—}(P)_z\text{—}OH$$

wherein M represents structural units of ethylene oxide, N represents structural units of $C_{3-18}$ 1,2-epoxyalkane, P represents structural units of $C_{6-18}$ alkyl glycidyl ether, x is 5 to 40, y is 0 to 20, z is 0 to 3 and R represents a $C_{6-22}$ linear or branched alkyl group.

Preferably, the nonionic surfactant used in the automatic dishwashing composition of the present invention has a formula selected from $$RO\text{-}(M)_x\text{-}(N)_y\text{—}OH, \text{ and}$$

$$RO\text{-}(M)_x\text{-}(N)_y\text{—}O\text{—}R'$$

wherein M and N are structural units derived from alkylene oxides (of which one is ethylene oxide); x is 5 to 40; y is 0 to 20; R represents a $C_{6-22}$ linear or branched alkyl group; and R' represents a group derived from the reaction of an alcohol precursor with a $C_{6-22}$ linear or branched alkyl halide, epoxyalkane or glycidyl ether.

Preferably, the nonionic surfactant used in the automatic dishwashing composition of the present invention has a formula $$RO\text{-}(M)_x\text{-}OH$$

wherein M represents structural units of ethylene oxide and x is at least three (preferably, at least five; preferably, no more than ten; more preferably, no more than eight). Preferably, wherein R and R' each have at least eight (more preferably, at least ten) carbon atoms.

Preferably, the automatic dishwashing composition of the present invention, includes a dispersant polymer. More preferably, the automatic dishwashing composition of the present invention, includes: 0.5 to 15 wt %, based on the dry weight of the automatic dishwashing composition, of a dispersant polymer. Still more preferably, the automatic dishwashing composition of the present invention, includes 0.5 to 10 wt %, based on the dry weight of the automatic dishwashing composition, of a dispersant polymer. Yet more preferably, the automatic dishwashing composition of the present invention, includes 1 to 8 wt %, based on the dry weight of the automatic dishwashing composition, of a dispersant polymer. Most preferably, the automatic dishwashing composition of the present invention, includes 2 to 6 wt %, based on the dry weight of the automatic dishwashing composition, of a dispersant polymer.

Preferably, the dispersant polymer used in the automatic dishwashing composition of the present invention comprises >60 to <90 wt % (preferably, 70 to 85 wt %; more preferably, 75 to 82.5 wt %; most preferably, 78 to 82 wt %), based on weight of the dispersant polymer, of structural units of formula I

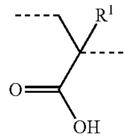

I wherein each $R^1$ is independently selected from a hydrogen and a —$CH_3$ group. More preferably, the dispersant polymer used in the automatic dishwashing composition of the present invention comprises >60 to <90 wt % (preferably, 70 to 85 wt %; more preferably, 75 to 82.5 wt %; most preferably, 78 to 82 wt %), based on weight of the dispersant polymer, of structural units of formula I; wherein $R^1$ is a hydrogen in 75 to 100 mol % (preferably, 90 to 100 mol %; more preferably, 98 to 100 mol %; still more preferably, ≥99 mol %; most preferably, 100 mol %) of the structural units of formula I in the dispersant polymer.

Preferably, the dispersant polymer used in the automatic dishwashing composition of the present invention comprises >10 to <40 wt % (preferably, 15 to 30 wt %; more preferably, 17.5 to 25 wt %; most preferably, 18 to 22 wt %), based on weight of the dispersant polymer, of structural units of formula II

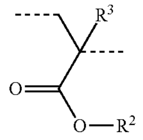

II wherein each $R^2$ is independently selected from the group consisting of a $C_{1-6}$ hydroxyalkyl group and a $C_{1-6}$ alkoxy group (preferably, a $C_{1-5}$ hydroxyalkyl group and a $C_{1-5}$ alkoxy group; more preferably, a $C_{1-4}$ hydroxyalkyl group and a $C_{1-4}$ alkoxy group; still more preferably, a $C_{2-4}$ hydroxyalkyl group and a $C_{2-4}$ alkoxy group; yet still more preferably, a $C_{2-4}$ hydroxyalkyl group; most preferably, a hydroxypropyl group); and wherein each $R^3$ is independently selected from a hydrogen and a methyl group. More preferably, the dispersant polymer used in the automatic dishwashing composition of the present invention comprises >10 to <40 wt % (preferably, 15 to 30 wt %; more preferably, 17.5 to 25 wt %; most preferably, 18 to 22 wt %), based on weight of the dispersant polymer, of structural units of formula II

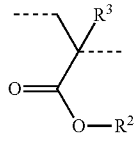

II wherein each $R^2$ is independently selected from a $C_{2-4}$ hydroxyalkyl group and a $C_{2-4}$ alkoxy group (preferably, a $C_{2-4}$ hydroxyalkyl group; more preferably, a hydroxypropyl group) and wherein each $R^3$ is independently selected from a hydrogen and a methyl group. Most preferably, the dispersant polymer used in the automatic dishwashing composition of the present invention comprises >10 to <40 wt % (preferably, 15 to 30 wt %; more preferably, 17.5 to 25 wt %; most preferably, 18 to 22 wt %), based on weight of the dispersant polymer, of structural units of formula II, wherein $R^2$ is a hydroxypropyl group in 75 to 100 mol % (preferably, 90 to 100 mol %; more preferably, 98 to 100 mol %; most preferably, 100 mol %) of the structural units of formula II in the dispersant polymer; and wherein $R^3$ is a hydrogen in 75 to 100 mol % (preferably, 90 to 100 mol %; more preferably, 98 to 100 mol %; most preferably, 100 mol %) of the structural units of formula II in the dispersant polymer.

Preferably, the dispersant polymer used in the automatic dishwashing composition of the present invention has a weight average molecular weight of 1,200 to 25,000 Daltons. More preferably, the dispersant polymer used in the automatic dishwashing composition of the present invention has a weight average molecular weight of 1,500 to 20,000 Daltons. Still more preferably, the dispersant polymer used in the automatic dishwashing composition of the present invention has a weight average molecular weight of 1,750 to 17,500 Daltons. Most preferably, the dispersant polymer used in the automatic dishwashing composition of the present invention has a weight average molecular weight of 1,900 to 14,250 Daltons.

Preferably, the dispersant polymer used in the automatic dishwashing composition of the present invention comprises ≤0.3 wt % (more preferably, ≤0.1 wt %; still more preferably, ≤0.05 wt %; yet still more preferably, ≤0.03 wt %; most preferably, ≤0.01 wt %) of structural units of multi-ethylenically unsaturated crosslinking monomer.

Preferably, the dispersant polymer used in the automatic dishwashing composition of the present invention comprises ≤1 wt % (preferably, ≤0.5 wt %; more preferably, ≤0.001 wt %; still more preferably, ≤0.0001 wt %; most preferably, < the detectable limit) of structural units of sulfonated monomer. More preferably, the dispersant polymer used in the automatic dishwashing composition of the present invention comprises ≤1 wt % (preferably, ≤0.5 wt %; more preferably, ≤0.001 wt %; still more preferably, ≤0.0001 wt %; most preferably, < the detectable limit) of structural units of sulfonated monomer selected from the group consisting of 2-acrylamido-2-methylpropane sulfonic acid (AMPS), 2-methacrylamido-2-methylpropane sulfonic acid, 4-styrenesulfonic acid, vinylsulfonic acid, 3-allyloxy sulfonic acid, 2-hydroxy-1-propane sulfonic acid (HAPS), 2-sulfoethyl (meth)acrylic acid, 2-sulfopropyl(meth)acrylic acid, 3-sulfopropyl(meth)acrylic acid, 4-sulfobutyl(meth)acrylic acid and salts thereof. Most preferably, the dispersant polymer used in the automatic dishwashing composition of the present invention comprises ≤1 wt % (preferably, ≤0.5 wt %; more preferably, ≤0.001 wt %; still more preferably, ≤0.0001 wt %; most preferably, < the detectable limit) of structural units of 2-acrylamido-2-methylpropane sulfonic acid (AMPS) monomer.

Methods of making the dispersant copolymers used in the automatic dishwashing composition of the present invention are well known to persons skilled in the art of copolymerization.

Preferably, the automatic dishwashing composition of the present invention further comprises 0.1 to 15 wt % (more preferably, 0.5 to 10 wt %; still more preferably, 0.75 to 7 wt %; most preferably, 0.9 to 5 wt %), based on the dry weight of the automatic dishwashing composition, of a phosphonate. More preferably, the automatic dishwashing composition of the present invention comprises 0.1 to 15 wt % (more preferably, 0.5 to 10 wt %; still more preferably, 0.75 to 7 wt %; most preferably, 0.9 to 5 wt %), based on the dry weight of the automatic dishwashing composition, of a phosphonate; wherein the phosphonate is a low molecular weight having a weight average molecular weight of ≤1,000 Daltons. Still more preferably, the automatic dishwashing composition of the present invention comprises 0.1 to 15 wt % (more preferably, 0.5 to 10 wt %; still more preferably, 0.75 to 7 wt %; most preferably, 0.9 to 5 wt %), based on the dry weight of the automatic dishwashing composition, of a phosphonate; wherein the phosphonate comprises at least one of 1-hydroxyethylidene-1,1-diphosphonic acid (HEDP) and a salt of 1-hydroxyethylidene-1,1-diphosphonic acid. Most preferably, the automatic dishwashing composition of the present invention comprises 0.1 to 15 wt % (more preferably, 0.5 to 10 wt %; still more preferably, 0.75 to 7 wt %; most preferably, 0.9 to 5 wt %), based on the dry weight of the automatic dishwashing composition, of a phosphonate; wherein the phosphonate is selected from the group consisting of 1-hydroxyethylidene-1,1-diphosphonic acid (HEDP) and salts thereof.

The automatic dishwashing composition of the present invention, optionally further comprises an additive. Preferably, the automatic dishwashing composition of the present invention, further comprises an additive selected from the group consisting of an alkaline source; a bleaching agent (e.g., sodium percarbonate, sodium perborate); a bleach activator (e.g., tetraacetylethylenediamine (TAED)); a bleach catalyst (e.g., manganese(II) acetate, cobalt(II) chloride, bis(TACN)magnesium trioxide diacetate); an enzyme (e.g., protease, amylase, lipase, or cellulase); a foam suppressant; a coloring agent; a fragrance; an additional builder; an antibacterial agent; a filler; a deposit control polymer and mixtures thereof. More preferably, the automatic dishwashing composition of the present invention, further comprises an additive, wherein the additive is selected from the group consisting of a bleaching agent, a bleach activator, an enzyme, a filler and mixtures thereof. Still more preferably, the automatic dishwashing composition of the present invention, further comprises an additive, wherein the additive includes a bleaching agent (e.g., sodium percarbonate, sodium perborate); a bleach activator (e.g., tetraacetylethylenediamine (TAED)) and an enzyme (e.g., protease, amylase, lipase, or cellulase). Most preferably, the automatic dishwashing composition of the present invention, further comprises an additive, wherein the additive includes a bleaching agent, wherein the bleaching agent includes sodium percarbonate; a bleach activator, wherein the bleach activator includes tetraacetylethylenediamine (TAED); and an enzyme, wherein the enzyme includes a protease and an amylase.

Fillers included in tablets or powders are inert, water-soluble substances, typically sodium or potassium salts (e.g., sodium sulfate, potassium sulfate, sodium chloride, potassium chloride). In tablets and powders, fillers are typically present in amounts ranging from 0 wt % to 75 wt %. Fillers included in gel formulations typically include those mentioned for use in tablets and powders and also water. Fragrances, dyes, foam suppressants, enzymes and antibacterial agents usually total no more than 10 wt %, alternatively no more than 5 wt %, of the automatic dishwashing composition.

The automatic dishwashing composition of the present invention, optionally further comprises: an alkaline source. Suitable alkaline sources include, without limitation, alkali metal carbonates and alkali metal hydroxides, such as sodium or potassium carbonate, bicarbonate, sesquicarbonate, sodium, lithium, or potassium hydroxide, or mixtures of the foregoing. Sodium hydroxide is preferred. The amount of alkaline source in the automatic dishwashing composition of the present invention (if any) is at least 1 wt % (preferably, at least 20 wt %) and up to 80 wt % (preferably, up to 60 wt %), based on the dry weight of the automatic dishwashing composition.

The automatic dishwashing composition of the present invention, optionally further comprises: a bleaching agent (e.g., sodium percarbonate). The amount of the bleaching agent in the automatic dishwashing composition of the present invention (if any) is preferably at a concentration of 1 to 25 wt % (more preferably, 5 to 20 wt %), based on the dry weight of the automatic dishwashing composition.

The automatic dishwashing composition of the present invention, optionally further comprises: a bleach activator (e.g., tetraacetylethylenediamine (TAED)). The amount of the bleach activator in the automatic dishwashing composition of the present invention (if any) is preferably at a concentration of 1 to 10 wt % (more preferably, 2.5 to 7.5 wt %), based on the dry weight of the automatic dishwashing composition.

Preferably, the automatic dishwashing composition of the present invention comprises ≤1 wt % (preferably, ≤0.5 wt %; more preferably, ≤0.2 wt %; still more preferably, ≤0.1 wt %; yet still more preferably, ≤0.01 wt %; most preferably, < the detectable limit), based on the dry weight of the automatic dishwashing composition, of phosphate (measured as elemental phosphorus). Preferably, the automatic dishwashing composition of the present invention is phosphate free.

Preferably, the automatic dishwashing composition of the present invention comprises ≤1 wt % (preferably, ≤0.5 wt %; more preferably, ≤0.2 wt %; still more preferably, ≤0.1 wt %; yet still more preferably, ≤0.01 wt %; most preferably, < the detectable limit), based on the dry weight of the automatic dishwashing composition, of builders selected from the group consisting of nitrilotriacetic acid; ethylenediaminetetraacetic acid; diethylenetriaminepentaacetic acid; glycine-N,N-diacetic acid; methyl glycine-N,N-diacetic acid; 2-hydroxyethyliminodiacetic acid; glutamic acid-N,N-diacetic acid; 3-hydroxy-2,2'-iminodissuccinate; S,S-ethylenediaminedisuccinate aspartic acid-diacetic acid; N,N'-ethylene diamine disuccinic acid; iminodisuccinic acid; aspartic acid; aspartic acid-N,N-diacetic acid; beta-alaninediacetic acid; polyaspartic acid; salts thereof and mixtures thereof. Most preferably, the automatic dishwashing composition of the present invention contains 0 wt % of builders selected from the group consisting of nitrilotriacetic acid; ethylenediaminetetraacetic acid; diethylenetriaminepentaacetic acid; glycine-N,N-diacetic acid; methyl glycine-N,N-diacetic acid; 2-hydroxyethyliminodiacetic acid; glutamic acid-N,N-diacetic acid; 3-hydroxy-2,2'-iminodissuccinate; S,S-ethylenediaminedisuccinate aspartic acid-diacetic acid; N,N'-ethylene diamine disuccinic acid; iminodisuccinic acid; aspartic acid; aspartic acid-N,N-diacetic acid; beta-alaninediacetic acid; polyaspartic acid; salts thereof and mixtures thereof.

Preferably, the automatic dishwashing composition of the present invention has a pH (at 1 wt % in water) of at least 7 (preferably, ≥9; more preferably, ≥9.5). Preferably, the automatic dishwashing composition of the present invention has a pH (at 1 wt % in water) of no greater than 13.

Preferably, the automatic dishwashing composition of the present invention can be formulated in any typical form, e.g., as a tablet, powder, block, monodose, sachet, paste, liquid or gel. The automatic dishwashing compositions of the present invention are useful for cleaning ware, such as eating and cooking utensils, dishes, in an automatic dishwashing machine.

Preferably, the automatic dishwashing composition of the present invention are suitable for use under typical operating conditions. For example, when used in an automatic dishwashing machine, typical water temperatures during the washing process preferably are from 20° C. to 85° C., preferably 30° C. to 70° C. Typical concentrations for the automatic dishwashing composition as a percentage of total liquid in the dishwasher preferably are from 0.1 to 1 wt %, preferably from 0.2 to 0.7 wt %. With selection of an appropriate product form and addition time, the automatic dishwashing compositions of the present invention may be present in the prewash, main wash, penultimate rinse, final rinse, or any combination of these cycles.

Preferably, the method of cleaning an article in an automatic dishwashing machine of the present invention, comprises: providing at least one article (e.g., cookware, bakeware, tableware, dishware, flatware and/or glassware; preferably, wherein the at least one article includes a plastic article; more preferably, wherein the at least one article includes a polyethylene article); providing an automatic dishwashing composition of the present invention; and applying the automatic dishwashing composition to the at least one article (preferably, in an automatic dishwasher).

Preferably, the method of cleaning an article in an automatic dishwashing machine of the present invention, comprises: (i) providing at least one article (e.g., cookware, bakeware, tableware, dishware, flatware and/or glassware; preferably, wherein the at least one article includes a plastic article; more preferably, wherein the at least one article includes a polyethylene article); (ii) providing an automatic dishwashing composition of the present invention, wherein the automatic dishwashing composition provided, comprises: 50 to 85 wt % of the builder, wherein the builder is selected from the group consisting of carbonates, bicarbonates, citrates, silicates and mixtures thereof and wherein the builder includes a mixture of at least one carbonate and at least one citrate; 0.75 to 7 wt % of the phosphonate; 1.5 to 7.5 wt % of the nonionic surfactant; and 2 to 6 wt % of the dispersant polymer; wherein the dispersant polymer comprises: (a) 75 to 82.5 wt % of structural units of formula I, wherein $R^1$ is a hydrogen in 98 to 100 mol % of the structural units of formula I; and (b) 17.5 to 25 wt % of structural units of formula II, wherein $R^2$ is an hydroxypropyl group in 98 to 100 mol % of the structural units of formula II and wherein $R^3$ is a hydrogen in 98 to 100 mol % of the structural units of formula II; and wherein the dispersant polymer has a weight average molecular weight, $M_W$, of 1,750 to 17,500 Daltons; and (iii) applying the automatic dishwashing composition to the at least one article (preferably, in an automatic dishwasher); wherein the formation of blue scale is inhibited.

Some embodiments of the present invention will now be described in detail in the following Examples.

The weight average molecular weight, $M_W$; number average molecular weight, $M_N$; and polydispersity (PDI) values reported in the Examples were measured by gel permeation chromatography (GPC) on an Agilent 1100 series LC system equipped with an Agilent 1100 series refractive index. Samples were dissolved in HPCL grade THF/FA mixture (100:5 volume/volume ratio) at a concentration of approximately 9 mg/mL and filtered through at 0.45 μm syringe filter before injection through a 4.6×10 mm Shodex KF guard column, a 8.0×300 mm Shodex KF 803 column, a 8.0×300 mm Shodex KF 802 column and a 8.0×100 mm Shodex KF-D column. A flow rate of 1 mL/min and temperature of 40° C. were maintained. The columns were calibrated with narrow molecular weight PS standards (EasiCal PS-2, Polymer Laboratories, Inc.).

Example S1: Polymer Synthesis

To a three liter round bottom flask, equipped with a mechanical stirrer, a temperature controller, heating mantle, a thermocouple, a condenser, nitrogent source and inlets for the addition of cofeeds, was added dipropylene glycol (747.4 g). The mechanic stirrer was engaged, a nitrogen sweep was established and the temperature controller was set to 96° C. Glacial acetic acid (526 g) was added to a graduated cylinder for addition to the flask. A 50% sodium hydroxide solution (8.83 g) was mixed with deionized water (80 g) and sodium persulfate (10.5 g) to form an initiator solution, which was transferred to a syringe for subsequent addition to the flask.

When the flask contents reached 96° C., the addition to the flask contents of the glacial acetic acid in the graduated cylinder and the initiator solution were started simultaneously through separate flask inlets. The glacial acetic acid was added at a rate of 4.38 g/min over 120 minutes and the initiator feed was added at a rate of 0.79 g/min over 125 minutes. At completion of the glacial acetic acid and initiator feeds, glacial acetic acid feed system was rinsed into the flack with deionized water (4 g). The flask contents were held for 15 minutes at 96° C. Then a chaser solution of sodium persulfate (2.6 g) dissolved in deionized water (5 g) was added to the flask contents over 10 minutes. The flask contents were then held for 30 minutes. After the hold, the flask contents were cooled and dipropylene glycol (208.7 g) was added to the flask contents followed by a deionized water (10 g) rinse into the flask contents. The polymer product obtained was then measured at 33.7 wt % solids with a residual acrylic acid content of 72 ppm by mass. The weight average molecular weight of the polymer product was 7,000 Daltons, as measured by gel permeation chromatography.

Example S2: Polymer Synthesis

To a two liter round bottom flask, equipped with a mechanical stirrer, a temperature controller, heating mantle, a thermocouple, a condenser, nitrogent source and inlets for the addition of cofeeds, was added deionized water (333.0 g). The mechanic stirrer was engaged, a nitrogen sweep was established and the temperature controller was set to 72° C. A monomer feed solution of glacial acetic acid (360 g) and hydroxypropyl acrylate (40 g) was added to a graduated cylinder for addition to the flask. A sodium persulfate (1.9 g) was mixed with deionized water (50 g) to form an initiator solution, which was transferred to a syringe for subsequent addition to the flask. A chain regulator solution of sodium metabisulfite (20.6 g) dissolved in deionized water (90 g) was prepared. A chain regulator pre-charge of sodium metabisulfite (1.45 g) dissolved in deionized water (10 g) was prepared.

When the flask contents reached 72° C., a 0.15% iron sulfate heptahydrate solution (3.2 g) was added to the flask contents Immediately thereafter, the chain regulator precharge was added to the flask contents and the monomer feed solution, the chain regulator solution and the initiator solution were started simultaneously through separate flask inlets. The monomer feed solution was added at a rate of 4.28 mL/min over 90 minutes. The initiator solution was added at a rate of 0.52 mL/min over 95 minutes. The chain regulator solution was added at a rate of 1.21 mL/min. All feeds began at 70° C. At completion of the feeds, deionized water (5 g) was rinsed through the monomer feed lines. The flask contents were held for 20 minutes at 72° C. Then a first chaser solution of sodium persulfate (0.52 g) dissolved in deionized water (20 g) was added to the flask contents over 10 minutes and then the flask contents were held for 20 minutes. Then a second chaser solution of sodium persulfate (0.52 g) dissolved in deionized water (20 g) was added to the flask contents over 10 minutes and then the flask contents were held for 20 minutes. After the final hold, the flask contents were cooled to 35° C. and gradually neutralized with 50% sodium hydroxide (152.7 g) added to the flask contents over 48 minutes using an addition funnel. The exotherm was controlled with the help of an ice bath to keep the flask contents below 40° C. After neutralization, the residual bisulfite was scavenged at 28° C. over 5 minutes with the addition of 35% hydrogen peroxide solution (5.46 g) to the flask contents. Finally, deionized water (20 g) was rinsed through the addition funnel into the flask contents. The polymer product obtained was then measured at 42.47 wt % solids with a residual acrylic acid content of <25 ppm by mass. The weight average molecular weight of the polymer product was 9,000 Daltons, as measured by gel permeation chromatography.

Example S3: Polymer Synthesis

To a two liter round bottom flask, equipped with a mechanical stirrer, a temperature controller, heating mantle, a thermocouple, a condenser, nitrogent source and inlets for the addition of cofeeds, was added deionized water (333.0 g). The mechanic stirrer was engaged, a nitrogen sweep was established and the temperature controller was set to 72° C. A monomer feed solution of glacial acetic acid (320 g) and hydroxypropyl acrylate (80 g) was added to a graduated cylinder for addition to the flask. A sodium persulfate (1.9 g) was mixed with deionized water (50 g) to form an initiator solution, which was transferred to a syringe for subsequent addition to the flask. A chain regulator solution of sodium metabisulfite (20.6 g) dissolved in deionized water (90 g) was prepared. A chain regulator pre-charge of sodium metabisulfite (1.45 g) dissolved in deionized water (10 g) was prepared.

When the flask contents reached 72° C., a 0.15% iron sulfate heptahydrate solution (3.2 g) was added to the flask contents Immediately thereafter, the chain regulator pre-charge was added to the flask contents and the monomer feed solution, the chain regulator solution and the initiator solution were started simultaneously through separate flask inlets. The monomer feed solution was added at a rate of 4.26 mL/min over 90 minutes. The initiator solution was added at a rate of 0.52 mL/min over 95 minutes. The chain regulator solution was added at a rate of 1.2 mL/min. All feeds began at 70° C. At completion of the feeds, deionized water (5 g) was rinsed through the monomer feed lines. The flask contents were held for 20 minutes at 72° C. Then a first chaser solution of sodium persulfate (0.52 g) dissolved in deionized water (20 g) was added to the flask contents over 10 minutes and then the flask contents were held for 20 minutes. Then a second chaser solution of sodium persulfate (0.52 g) dissolved in deionized water (20 g) was added to the flask contents over 10 minutes and then the flask contents were held for 20 minutes. After the final hold, the flask contents were cooled to 30° C. and gradually neutralized with 50% sodium hydroxide (136 g) added to the flask contents over 45 minutes using an addition funnel. The exotherm was controlled with the help of an ice bath to keep the flask contents below 40° C. After neutralization, the residual bisulfite was scavenged at 28° C. over 5 minutes with the addition of 35% hydrogen peroxide solution (4.38 g) to the flask contents. Finally, deionized water (20 g) was rinsed through the addition funnel into the flask contents. The polymer product obtained was then measured at 42.87 wt % solids with a residual acrylic acid content of <25 ppm by mass. The weight average molecular weight of the polymer product was 8,000 Daltons, as measured by gel permeation chromatography.

Example S4: Polymer Synthesis

To a three liter round bottom flask, equipped with a mechanical stirrer, a temperature controller, heating mantle, a thermocouple, a condenser, nitrogent source and inlets for the addition of cofeeds, was added deionized water (342 g). The mechanic stirrer was engaged, a nitrogen sweep was established and the temperature controller was set to 75° C. A monomer mixture of Glacial acetic acid (487 g), hydroxypropyl acrylate (324.7 g) and deionized water (20 g) was thoroughly mixed to form a monomer feed solution. Sodium persulfate (7 g) was mixed with deionized water (68 g) to form an initiator solution. Sodium metabisulfite (77.3 g) was dissolved in deionized water (127 g) to form a chain regulator solution. Sodium metabisulfite (5.89 g) was dissolved in deionized water (19.6 g) to form a chain regulator pre-charge solution. Ferrous sulfate heptahydrate (0.004 g) was diluted in deionized water (0.7 g) to form a promoter solution.

When the flask contents reached 75° C., the chain regulator pre-charge was added to the flask contents followed by a deionized water rinse (7.8 g). Then the promoter solution was added to the flask contents followed by a deionized water rinse (2 g). While maintaining the temperature control set point at 75° C. the monomer feed solution, the initiator solution and the chain regulator solution were cofed simultaneously and separately to the flask contents. The monomer feed solution was added to the flask contents at a rate of 4.62 g/min over 180 minutes. The initiator solution was added to the flask contents at a rate of 0.3 g/min over 190 minutes. The chain regulator solution was added to the flask contents at a rate of 1.28 g/min over 160 minutes. At completion of the cofeeds, the monomer feed was rinsed with deionized water (19.5 g) into the flask contents; the initiator solution was rinsed with deionized water (7.8 g) into the flask contents and the chain regulator solution was rinsed with deionized water (7.8 g) into the flask contents. The flask contents were then held for 10 minutes at 73° C. Then deionized water (25.5 g) was added to the flask contents. Then the flask contents were set to cool. While the temperature of the flask contents remained at >55° C., 30% active aqua ammonia (90.2 g) and a deionized water rinse (8 g) was added to the flask contents. When the temperature of the flask contents dropped to <50° C., a 35% hydrogen peroxide (12.3 g) solution and a deionized water rinse (8 g) was added to the flask contents. When the temperature of the flask contents fell back down to 50-55° C. a 70% tert-butyl hydroperoxide (1.7 g) in deionized water (8 g) reactor chase catalyst solution and a deionized water rinse (2 g) was added to the flask contents. Then a sodium sulfoxylate formaldehyde (1.1 g) dissolved in deionized water (8 g) chaser activator solution and a deionized water rinse (2 g) was added to the flask contents. When the temperature of the flask contents dropped to 45° C., 30% active aqua ammonia (293.4 g) and a deionized water rinse (8 g) was added to the flask contents. Then the flask contents were further diluted with deionized water (25.7 g). The polymer product obtained was then measured at 50 wt % solids with a residual acrylic acid content of <25 ppm by mass. The weight average molecular weight of the polymer product was 3,000 Daltons, as measured by gel permeation chromatography.

Polymer Compositions

Dispersant polymer compositions prepared according to Examples S1-S4 are summarized in TABLE 1.

TABLE 1

| Example | Monomer Feed composition (wt %) Acrylic acid | Hyrdoxypropyl Acrylate | Weight average molecular weight |
|---|---|---|---|
| S1 | 100 | — | 7,000 Daltons |
| S2 | 90 | 10 | 9,000 Daltons |
| S3 | 80 | 20 | 8,000 Daltons |
| S4 | 60 | 40 | 3,000 Daltons |

Comparative Examples DC1-DC4 and Example D1: Dishwashing Performance

Dishwashing compositions were prepared in each of Comparative Examples DC1-DC4 and Example D1 having the component formulations identified in TABLE 2. The protease used in each of the component formulations was Savinase® 12T protease available from Novozymes. The amylase used in each of the component formulations was Stainzyme® 12T amylase available from Novozymes.

TABLE 2

| | Concentration on solids basis (wt %) | | | | |
|---|---|---|---|---|---|
| Ingredient | DC1 | DC2 | DC3 | DC4 | D1 |
| Sodium Citrate | 30 | 30 | 30 | 30 | 30 |
| Sodium Carbonate | 30 | 30 | 30 | 30 | 30 |
| Sodium Percarbonate | 15 | 15 | 15 | 15 | 15 |
| TAED | 4 | 4 | 4 | 4 | 4 |
| Sodium Sulfate | 5 | 5 | 5 | 5 | 5 |
| Nonionic Surfactant[a] | 5 | 5 | 5 | 5 | 5 |
| HEDP[b] | 5 | 5 | 5 | 5 | 5 |
| Amylase | 1 | 1 | 1 | 1 | 1 |
| Protease | 2 | 2 | 2 | 2 | 2 |
| Polymer[c] | 3 | — | — | — | — |
| Dispersant Polymer Example S1 | — | 3 | — | — | — |
| Dispersant Polymer Example S2 | — | — | 3 | — | — |
| Dispersant Polymer Example S3 | — | — | — | — | 3 |
| Dispersant Polymer Example S4 | — | — | — | 3 | — |

[a]Dowfax ™ 20B102 nonionic linear alcohol alkoxylate available from The Dow Chemical Company.
[b]Cublen K 8514 GR 1-Hydroxyethane-1,1-diphosphonic acid available from Zschimmer & Schwarz
[c]Acusol ™ 445N dispersant (polyacrylic acid polymer) available from The Dow Chemical Company.

Procedure for Preparing Food Soil

The STIWA food soil described in TABLE 3 was prepared by the following procedure.

a) Bringing the water to a boil.
b) Mixing in a paper cup the instant gravy, the benzoic acid and the starch; and then adding the mixture to the boiling water.
c) Adding the milk and margarine to the product of (b).
d) Letting the product of (c) cool down to approximately 40° C., and then adding mixture to a kitchen mixer (Polytron).
e) Combining in another paper cup, the egg yolk, the ketchup and the mustard and mixing with a spoon.
f) Adding the product of (e) to the mixture of (d) in the blender with continuous stirring.
g) Letting the product of (f) stir in the blender for 5 minutes.
h) The freezing the product food soil mixture from (g).
i) 50 g of the frozen slush is placed into the dishwasher at beginning of the main wash.

TABLE 3

| Ingredient | wt % |
|---|---|
| Water | 70.9 |
| Margarine | 10.1 |
| Gravy Powder | 2.5 |
| Potato Starch | 0.5 |
| Benzoic Acid | 0.1 |
| Egg Yolk | 5.8 |
| Mustard | 2.5 |
| Ketchup | 2.5 |
| Milk | 5.1 |

Dishwashing Test Conditions

Machine: Miele SS-ADW, Model G1222SC Labor. Wash at 65° C.-30 min, prewash. Water: 37° fH hardness, Ca:Mg=3:1. Food soil: 50 g of the composition noted in TABLE 3 was introduced to the wash liquor frozen in a cup. Each dishwashing composition from Comparative Examples DC1-DC4 and Example D1 were tested, dosed at 20 g per wash.

Polystyrene Tumbler Filming and Spotting Evaluation

After 30 wash cycles under the above dishwashing test conditions, the polystyrene tumblers were dried in open air. After drying in open air following the 30$^{th}$ wash, filming and spotting ratings were determined by trained evaluators by observations of polystyrene tumblers in a light box with controlled illumination from below. Polystyrene tumblers were rated for filming and spotting according to ASTM method ranging from 1 (no film/spots) to 5 (heavily filmed/spotted). An average value of 1 to 5 for filming and spotting was determined as reported in TABLE 4.

TABLE 4

| | Thirty Cycle Score | |
|---|---|---|
| Composition | Filming | Spotting |
| Comp. Example DC1 | 5 | 3 |
| Comp. Example DC2 | 3 | 3 |
| Comp. Example DC3 | 5 | 4 |
| Comp. Example DC4 | 5 | 3 |
| Example D1 | 3 | 3 |

LIBBEY™ Glass Tumbler Filming and Spotting Evaluation

After 30 wash cycles under the above dishwashing test conditions, the glass tumblers were dried in open air. After drying in open air following the 30$^{th}$ wash, filming and spotting ratings were determined by trained evaluators by observations of glass tumblers in a light box with controlled illumination from below. LIBBEY™ glass tumblers were rated for filming and spotting according to ASTM method ranging from 1 (no film/spots) to 5 (heavily filmed/spotted). An average value of 1 to 5 for filming and spotting was determined as reported in TABLE 5.

TABLE 5

| | Thirty Cycle Score | |
|---|---|---|
| Composition | Filming | Spotting |
| Comp. Example DC1 | 5 | 1 |
| Comp. Example DC2 | 2 | 2 |
| Comp. Example DC3 | 4 | 1 |
| Comp. Example DC4 | 5 | 1 |
| Example D1 | 1 | 1 |

SCHOTT™ Glass Filming and Spotting Evaluation

After 30 wash cycles under the above dishwashing test conditions, the SCHOTTt™ Glasses were dried in open air. After drying in open air following the 30$^{th}$ wash, filming and spotting ratings were determined by trained evaluators by observations of SCHOTT™ Glasses in a light box with controlled illumination from below. SCHOTT™ Glasses were rated for filming and spotting according to ASTM method ranging from 1 (no film/spots) to 5 (heavily filmed/spotted). An average value of 1 to 5 for filming and spotting was determined as reported in TABLE 6.

TABLE 6

| | Thirty Cycle Score | |
|---|---|---|
| Composition | Filming | Spotting |
| Comp. Example DC1 | 5 | 1 |
| Comp. Example DC2 | 2 | 1 |
| Comp. Example DC3 | 5 | 1 |
| Comp. Example DC4 | 5 | 1 |
| Example D1 | 1 | 1 |

Soda Lime Flat Glass Filming and Spotting Evaluation

After 30 wash cycles under the above dishwashing test conditions, the soda lime flat glass were dried in open air.

After drying in open air following the 30th wash, filming and spotting ratings were determined by trained evaluators by observations of soda lime flat glass in a light box with controlled illumination from below. Soda lime flat glass was rated for filming and spotting according to ASTM method ranging from 1 (no film/spots) to 5 (heavily filmed/spotted). An average value of 1 to 5 for filming and spotting was determined as reported in TABLE 7.

TABLE 7

| | Thirty Cycle Score | |
|---|---|---|
| Composition | Filming | Spotting |
| Comp. Example DC1 | 5 | 1 |
| Comp. Example DC2 | 1 | 1 |
| Comp. Example DC3 | 1 | 1 |
| Comp. Example DC4 | 2 | 1 |
| Example D1 | 1 | 1 |

Stainless Steel Filming and Spotting Evaluation

After 30 wash cycles under the above dishwashing test conditions, the stainless steel butter dishes were dried in open air. After drying in open air filming and spotting ratings were determined by trained evaluators by observations of the stainless steel butter dishes in a light box with controlled illumination. Stainless steel butter dishes were rated for filming color and spotting according to ASTM method ranging from 1 (no film/spots) to 5 (heavily filmed/spotted). The filming color and an average value of 1 to 5 for spotting was determined as reported in TABLE 8. An average ΔE value was obtained from the stainless steel butter dishes using a colorimeter. The results for the stainless steel butter dishes are reported in TABLE 8.

TABLE 8

| | Stainless Steel Butter Dishes | | |
|---|---|---|---|
| Composition | Film Color | Spotting | ΔE |
| Comp. Example DC1 | a | 1.0 | 4.5 |
| Comp. Example DC2 | b | 1.7 | 20.7 |
| Comp. Example DC3 | c | 1.4 | 16.4 |
| Comp. Example DC4 | d | 1.5 | 12.9 |
| Example D1 | e | 1.2 | 11.2 |

a Mod-heavy brown & blueish film
b Slight-moderate brown tint
c Moderate blueish tint
d Light-moderate blueish tint
e Light brown tint

We claim:

1. An automatic dishwashing composition, consisting of:

a builder, wherein the builder is a mixture of at least one carbonate and at least one citrate;

a nonionic surfactant; and a dispersant polymer consisting of:

(a) 78 to 82 wt %, based on weight of the dispersant polymer, of structural units of formula I

I

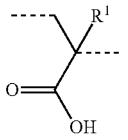

wherein each $R^1$ is independently selected from a hydrogen and a —$CH_3$ group; wherein $R^1$ is a hydrogen in 98 to 100 mol % of the structural units of formula I; and (b) 18 to 22 wt %, based on weight of the dispersant polymer, of structural units of formula II

II

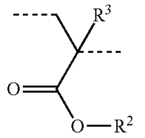

wherein each $R^2$ is independently selected from the group consisting of a $C_{2-4}$ hydroxyalkyl group and a $C_{2-4}$ alkoxy group; and wherein each $R^3$ is independently selected from a hydrogen and a methyl group; wherein $R^3$ is a hydrogen in 98 to 100 mol % of the structural units of formula II; wherein the dispersant polymer has a weight average molecular weight of 1,750 to 17,500 Daltons; and optionally, an additive selected from the group consisting of a bleaching agent, a bleach activator, a bleach catalyst, an enzyme, a filler, a fragrance, a dye, a foam suppressant, a phosphonate, and mixtures thereof;

wherein the bleaching agent is selected from the group consisting of sodium percarbonate, sodium perborate and mixtures thereof;

wherein the bleach activator is tetraacetylethylenediamine;

wherein the bleach catalyst is selected from the group consisting of manganese (II) acetate, cobalt (II) chloride, bis(TACN)magnesium trioxide diacetate and mixtures thereof;

wherein the enzyme is selected from the group consisting of protease, amylase, lipase, cellulase and mixtures thereof; and wherein the filler is selected from the group consisting of sodium sulfate, potassium sulfate, sodium chloride, potassium chloride and mixtures thereof.

2. The automatic dishwashing composition of claim 1, wherein the additive is present, and wherein the additive is selected from the group consisting of a bleaching agent, a bleach activator, an enzyme, a filler, and mixtures thereof.

3. The automatic dishwashing composition of claim 2, wherein the additive is a mixture of a bleaching agent; a bleach activator and an enzyme.

4. The automatic dishwashing composition of claim 1, having:

50 to 85 wt %, based on dry weight of the automatic dishwashing composition, of the builder, wherein the builder is selected from the group consisting of carbonates, bicarbonates, citrates, and mixtures thereof;

0.75 to 7 wt %, based on dry weight of the automatic dishwashing composition, of the phosphonate;

1.5 to 7.5 wt %, based on dry weight of the automatic dishwashing composition, of the nonionic surfactant; and 2 to 6 wt %, based on dry weight of the automatic dishwashing composition, of the dispersant polymer; wherein $R^2$ is an hydroxypropyl group in 98 to 100 mol % of the structural units of formula II.

5. A method of cleaning an article in an automatic dishwashing machine, comprising:

providing at least one article;

providing an automatic dishwashing composition according to claim 1; and, applying the automatic dishwashing composition to the at least one article.

* * * * *